United States Patent [19]

Williams

[11] 4,262,915
[45] Apr. 21, 1981

[54] LOW FRICTION DRAG SEALS

[75] Inventor: Arthur J. Williams, Youngstown, Ohio

[73] Assignee: Commercial Shearing, Inc., Youngstown, Ohio

[21] Appl. No.: 89,452

[22] Filed: Oct. 30, 1979

Related U.S. Application Data

[63] Continuation of Ser. No. 897,176, Apr. 17, 1978, abandoned.

[51] Int. Cl.³ .............................................. F16J 15/32
[52] U.S. Cl. .................................. 277/188 R; 277/205
[58] Field of Search .............. 277/188 R, 188 A, 205, 277/9, 58, 152, 153

[56] References Cited

U.S. PATENT DOCUMENTS

| | | | |
|---|---|---|---|
| 2,639,198 | 5/1953 | Kirkham | 277/188 R |
| 3,003,799 | 10/1961 | Marchionda et al. | 277/182 |
| 3,477,731 | 11/1969 | Workman | 277/58 |
| 4,087,098 | 5/1978 | Alley | 277/9 |
| 4,143,586 | 3/1979 | Zittiug | 277/188 R |

FOREIGN PATENT DOCUMENTS 929528 6/1963 United Kingdom .

*Primary Examiner*—Robert I. Smith
*Attorney, Agent, or Firm*—Buell, Blenko, Ziesenheim & Beck

[57] ABSTRACT

A low friction drag seal is provided for use between a housing and a linearly movable cylindrical member subject to fluid pressure in the form of an annular chamber surrounding the cylindrical member in one of the housing and cylindrical member, a generally right triangular cross section elastomer ring in said annular chamber surrounding said cylindrical member and in contact with a relatively movable surface on one of the cylinder and housing at an apex of said elastomer ring and a generally rigid back up ring having an inclined surface extending away from said relatively movable surface and in contact with the hypotenuse of the generally triangular member.

7 Claims, 7 Drawing Figures

LOW FRICTION DRAG SEALS

This application is a continuation of my co-pending application Ser. No. 897,176, filed Apr. 17, 1978 and now abandoned.

This invention relates to low friction drag seals and particularly to drag seals for sealing linear moving spools and the like.

There are numerous applications where drag seals are incorporated to prevent the leaking of high pressure fluids along a member moving linearly relative to another member. A typical application of such drag seals is at the ends of a control spool for hydraulic valves where the spool moves linearly in a bore in a valve housing between several control positions, at least some of which involve high pressure fluid.

Historically, such end seals have consisted of an elastomer "O" ring around the ends of the spool held in a sealing chamber in the housing by a backing ring. Pressure fluid reaching the sealing chamber causes the "O" ring to be flattened in the direction parallel to the axis of the spool and enlarged radially of the spool. This in turn increases dramatically the elastomer contact surface on the spool surface and consequently the frictional drag on the spool and the force required to move it from one position to another. This dramatic increase in frictional force is undesirable and makes shifting of the spool difficult and erratic. Unfortunately, while technology has developed many improvements in designs which have reduced the flow forces within such valves and improved their efficiency, the drag seals have resisted any major improvements and their inherent problems have continued to plague the industry.

The present invention provides a new drag seal which solves many of the problems which have characterized "O" ring drag seal in linear motion spool valves. The drag seal of this invention substantially reduces the spiral twisting normally associated with "O" ring seals and materially reduces the drag forces on the spool at elevated pressures. As a result, linear spool valves using the drag seal of this invention are significantly easier and smoother in operation without any loss of sealing efficiency.

The present invention provides, between a linearly moving cylindrical member and a housing having a bore in which the cylindrical member moves, annular chamber surrounding the cylindrical member, a generally triangular cross section elastomer ring surrounding said cylindrical member and in contact with the moving surface at the apex of said triangular cross section, and a generally rigid back up ring having an inclined face contacting the hypotenuse of the generally triangular member on the side opposite that to which fluid pressure is applied. Preferably the generally triangular cross section elastomer ring is indented at least on the side adjacent the apex contacting the cylindrical member to provide at least a slight V shaped configuration. Preferably the back up ring is made of plastic with a slightly turned down edge opposite the inclined face to act as a dirt scraper lip. The elastomer ring and back up ring may be assembled in a plastic or metal carrier case. A metal expander may be used in the V shape elastomer ring to aid in opening the V ring into sealing contact.

In the foregoing general outline certain objects, purposes and advantages of this invention have been set out. Other objects, purposes and advantages of this invention will be apparent from a consideration of the following description and the accompanying drawings in which.

Figure 1:
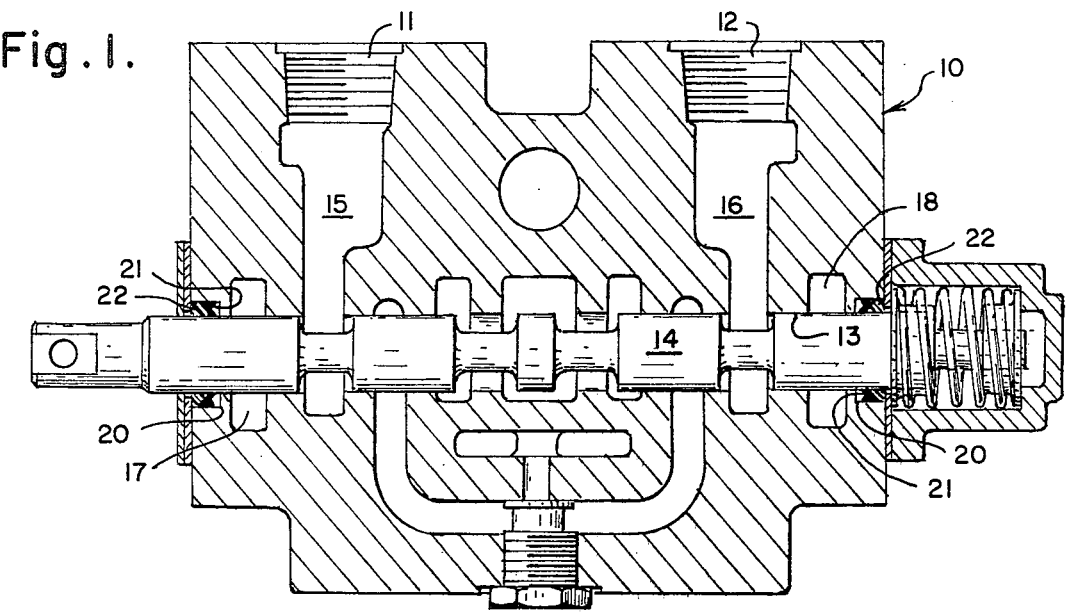
FIG. 1 is a section through a typical spool valve including the drag seal of this invention at each end.

Referring to the drawings there is illustrated a conventional spool valve structure having a housing 10 with inlet and outlet ports, not shown, a pair of work ports 11 and 12, a bore 13 carrying a linearly sliding spool 14 with the necessary high pressure chambers 15-16 and exhaust chambers 17-18. At each end of housing 10 are provided annular chambers 20 surrounding spool 14 and coaxial with bore 13. Each annular chamber 20 carries an elastomer (rubber) ring 21 of generally right triangular shape with the apex contacting spool 14. A backing ring 22 of plastic, such as Nylon, polytetrafluoroethylene, etc., preferably glass impregnated and having a sloping or inclined end 23 engages the elastomer ring 21, with the hyptoenuse of ring 21 resting on sloping or inclined end 23 of ring 22. Backing ring 22 is preferably provided with a radially inwardly extending dirt scraper lip 24 which bears on spool 14 and acts to prevent or reduce an ingress of dirt into the seal. The elastomer ring 21 is preferably provided with indentations 25 and 26 on its two short legs and particularly on the leg adjacent the apex contacting spool 14.

In operation, pressure fluid from housing 10 escapes along spool 14 into chamber 20 and pressurizes the elastomer ring at indentation 25 causing the ring to be forced tightly onto sloping surface 23 of backing ring 22 and to seal against the wall of chamber 20 and through the apex of the ring in contact with spool 14, to seal spool 14, however, with little increase in surface contact between the elastomer seal 21 and spool 14. Thus, when it is desired to move spool 14 laterally in bore 13 to deliver pressure to one of the work ports, there is little change in the surface contact between the spool and seal and thus little change in the frictional forces on the spool as distinguished from the major changes in frictional forces which occur when a conventional "O" ring is used for this purpose as has been prior art practice.

Figure 2:
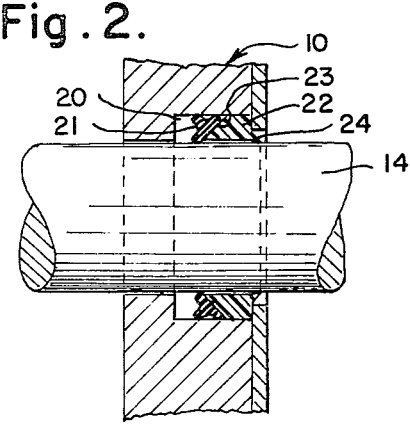
FIG. 2 is an enlarged fragmentary section of one end of the spool valve of FIG. 1 showing the drag seal of this invention.
Figure 2A:
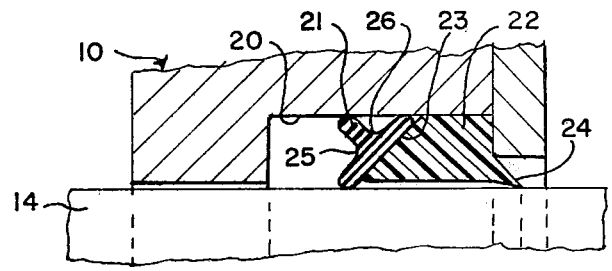
FIG. 2a is an enlarged fragmentary section of the drag seal of FIGS. 1 and 2 pressurized.
Figure 3:
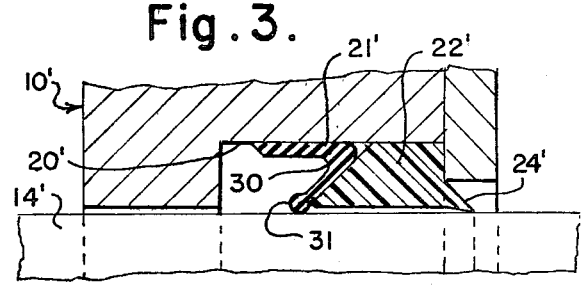
FIG. 3 is a fragmentary section of a second embodiment of drag seal according to this invention.

In FIG. 3 there is illustrated a second embodiment of this invention in which those parts which are identical to parts in FIGS. 2 and 2a are given like numbers with a prime sign. This embodiment differs in that the elastomer ring 21' has a very deep indentation 30 on the side adjacent the apex contacting spool 14' so as to be virtually V shaped. The sealing apex 31 is formed as a miniature "O" ring. Operationally it is essentially the same as the embodiment of FIGS. 2 and 2a.

Figure 4:
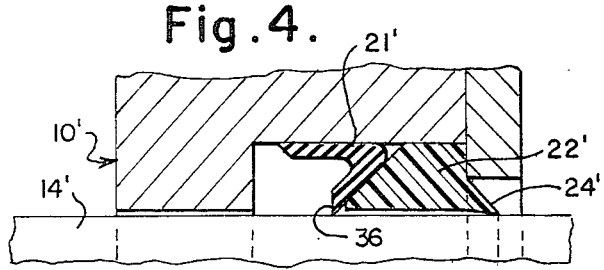
FIG. 4 is a fragmentary section of a third embodiment of drag seal according to this invention.
Figure 5:
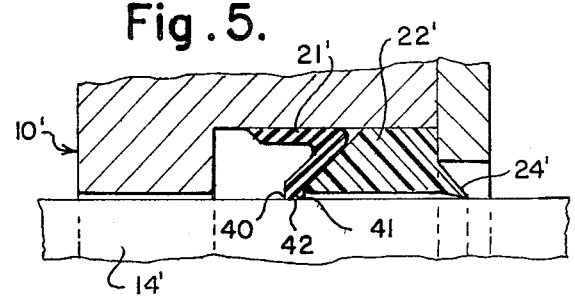
FIG. 5 is a fragmentary section of a fourth embodiment of drag seal according to this invention.

FIGS. 4 and 5 are essentially the same as FIG. 3 except in the case of FIG. 4 the sealing apex 36 is a sharp edge and in FIG. 5 is a pair of sealing edges 40 and 41 separated by an indentation 42.

Figure 6:
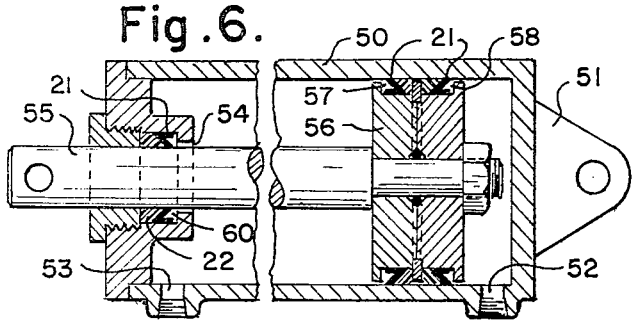
FIG. 6 is a section through a fluid piston incorporating the drag seal of this invention.

In FIG. 6 there is illustrated an air or hydraulic cylinder using the drag seal of this invention. In this structure an outer cylinder 50 is provided with a clevis 51 at one end, fluid ports 52 and 53 at opposite ends for passage of control fluid into and out of the cylinder and an opening 54 for piston rod 55. Piston rod 55 carries a piston 56 having two spaced annular chambers 57 and 58 each carrying an elastomer seal ring 21 and a plastic back up ring 22 of any of the forms illustrated in FIGS. 1-5. Opening 54 is similarly provided with a chamber 60 carrying elastomer seal ring 21 and back up ring 22. In all cases the frictional drag of the seals is much less than that experienced with conventional "O" ring seals.

In the foregoing specification certain preferred embodiments and practices of this invention have been set forth, however, this invention may be otherwise embodied within the scope of the following claims.

I claim:

1. In a fluid apparatus having a housing and a linearly moving cylindrical member movable in a bore in said housing, the improvement comprising an annular chamber surrounding the cylindrical member in one of the housing and cylindrical member, and defined by two spaced annular end walls and a bottom surface, a generally rigid back-up ring in said annular chamber having a generally elongate quadrilateral shape with one side bearing against the bottom surface of the annular chamber and an adjacent second side bearing against an end wall of said annular chamber, an inclined surface on the third side opposite said second side extending angularly from the relatively movable surface to the said one side in the direction of said second side, a fourth side generally parallel to said first side adjacent the relatively movable surface, an elastomer ring having three spaced edges in said annular chamber, said elastomer ring having a generally triangular cross section such that straight lines drawn between said three spaced edges define at least one generally 45° angle, a generally V-notch in at least one side of said elastomer ring opposite said 45° angle open to said annular chamber, a second side adjacent said V-notch bearing at least in part against the bottom wall of said annular chamber and a third side of said elastomer ring bearing at least in part against the inclined surface of said back-up ring whereby the edge of said elastomer ring member between said one side and said third side is in sealing contact with said relatively movable surface and a depending edge on said back-up member between the second and fourth sides of said back-up ring depends below said fourth side in contact with said relatively movable surface.

2. In a fluid apparatus as claimed in claim 1 wherein the generally triangular elastomer ring is indented on the said first and second sides to provide at least a slight V-shaped configuration in each of said sides.

3. In a fluid apparatus as claimed in claim 1 wherein the elastomer ring has a generally V-shape with an apex edge bearing on the movable surface in the form of a small diameter cross section.

4. In a fluid apparatus as claimed in claims 1, or 2 or 3 wherein the back-up ring is made of Nylon.

5. In a fluid apparatus as claimed in claim 4 wherein the back-up ring has a turned down edge on the fourth side adjacent said second side contacting said moving surface.

6. In a fluid apparatus as claimed in claim 1 wherein the elastomer ring has a generally V-shape with an apex edge bearing on the movable surface in the form of a sharp edge.

7. In a fluid apparatus as claimed in claim 1 wherein the elastomer ring has a generally V-shape with an apex edge bearing on the movable member in the form of a pair of spaced edges separated by an indentation.

* * * * *